Figure 1:
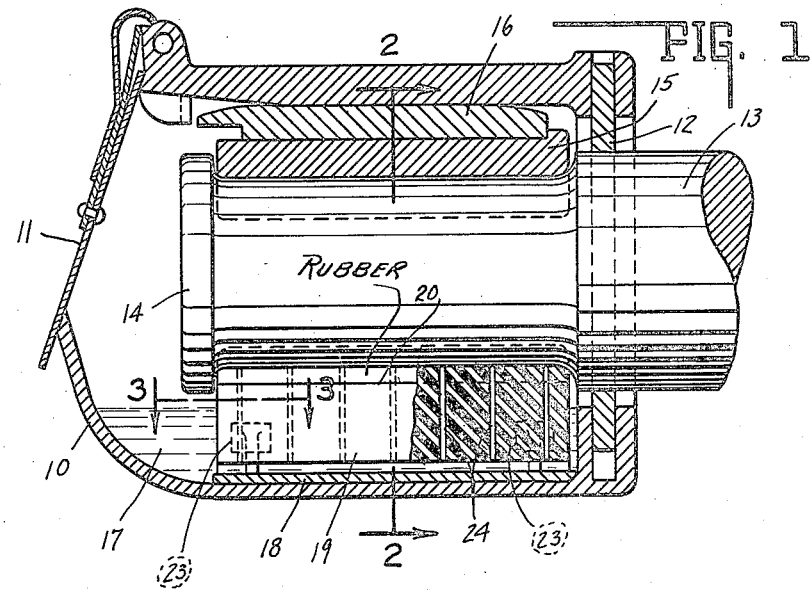

Dec. 27, 1938.  H. E. BEHRMANN  2,141,897

JOURNAL BOX

Filed April 16, 1936  2 Sheets-Sheet 1

INVENTOR.
HAROLD E. BEHRMANN.

BY Lockwood Goldsmith & Galt
ATTORNEYS.

Dec. 27, 1938.   H. E. BEHRMANN   2,141,897
JOURNAL BOX
Filed April 16, 1936    2 Sheets-Sheet 2
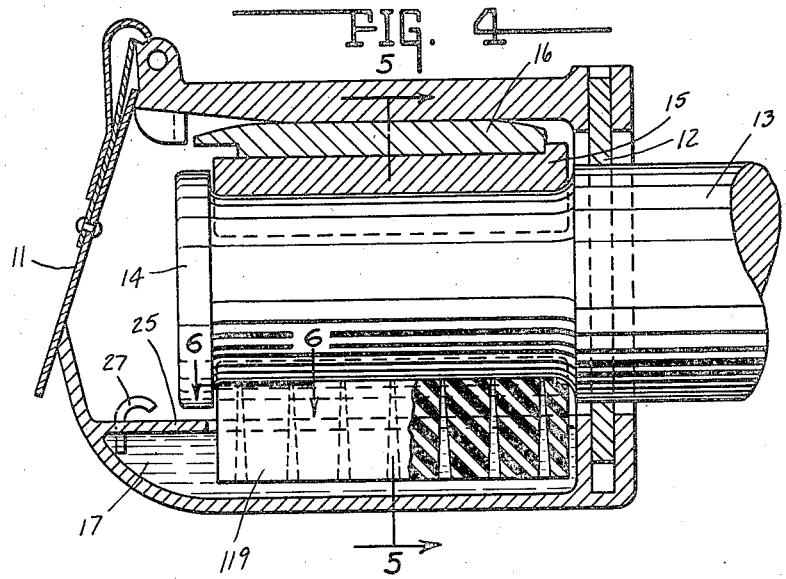
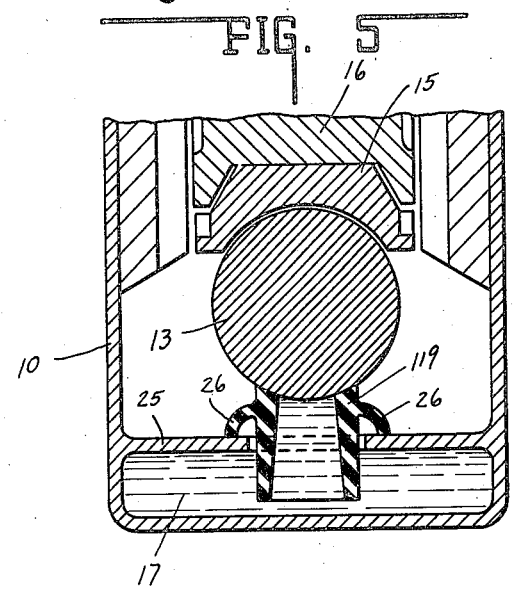
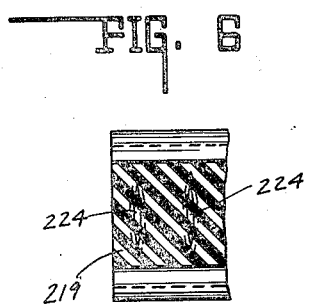
INVENTOR.
HAROLD E. BEHRMANN.
BY Lockwood Goldsmith & Galt
ATTORNEYS.

Patented Dec. 27, 1938

2,141,897

UNITED STATES PATENT OFFICE 2,141,897

JOURNAL BOX

Harold E. Behrmann, Indianapolis, Ind., assignor of one-half to Frank M. McHale, Indianapolis, Ind.

Application April 16, 1936, Serial No. 74,635

3 Claims. (Cl. 308—88)

This invention relates to improvements in the lubrication of journal boxes for railway trucks, and particularly with respect to the feeding of lubricant to the surface of the journal.

As is well understood, lubricating difficulties resulting in hot boxes are of common occurrence, causing delays and expensive repairs and replacements. The usual practice of stuffing the journal box with lubricant saturated waste requires constant attention due to the waste packing down away from the surface of the journal so that it fails to function, or becoming glazed through constant contact with the journal which prevents proper feeding of lubricant to the journal surface. Furthermore, fibres from the waste may be carried between the journal and bearing resulting in frictional resistance as well as marring of the bearing surface.

It is the purpose of this invention to provide a lubricating block other than the usual waste which will at all times engage the bearing surface to feed lubricant thereto and have no loose fibres, such as may affect the bearing surface. Furthermore, the lubricating block herein proposed is, by its flexibility and resiliency, adapted to maintain such contact with the bearing surface as to prevent any dirt or foreign material from passing to the bearing surface, and, in fact, prevent dirt or foreign material from remaining on the surface of the journal. It is further designed to make the lubricating block of a material sufficiently flexible and resilient to allow for compression of the block caused by the lateral movement of the journal, and at the same time enable oil or other lubricant to be fed the entire length of the journal so that the bearing surface thereof is continuously supplied with sufficient lubricant.

One feature of the invention resides in the provisions of a flexible and resilient material, such as a synthetic rubber, provided with oil passages through which oil is fed to the bearing surface by capillary attraction and suction created by rotation of the journal.

Another feature of the invention resides in the means for maintaining the proper surface contact between the lubricating block and the journal.

Still another feature of the invention resides in the provision of an oil chamber provided with a syphon as an integral part thereof for returning surplus oil to the oil reservoir free from sediment or foreign material.

Figure 2:
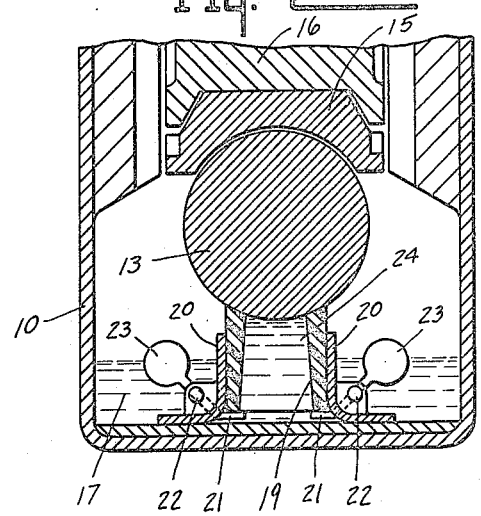
Figure 3:
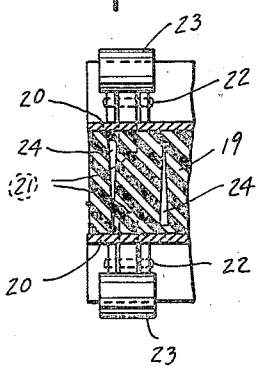

The full nature of the invention will be understood from the accompanying drawings and the following description and claims:

Fig. 1 is a longitudinal section through a journal box showing the journal and a portion of the lubricating block in elevation. Fig. 2 is a section taken on the line 2—2 of Fig. 1. Fig. 3 is a section taken on the line 3—3 of Fig. 1. Fig. 4 is the same as Fig. 1 showing a modified form of journal box and lubricating block mounting. Fig. 5 is a section taken on the line 5—5 of Fig. 1. Fig. 6 is a section taken on the line 6—6 of Fig. 4.

In the drawings there is shown the usual journal box 10 having a hinged box lid 11 and the usual dust guard 12. The journal 13, having a flange 14 on the outer end thereof, extends into the box and supports thereon the brass or bearing 15 which is held in place in the usual manner by a wedge 16.

The lower portion of the box provides an oil sump or lubricant containing reservoir in which there is maintained a quantity of lubricant 17. Supported along the bottom of the box there is an oil feeding unit comprising the base plate 18 upon which there is supported a flexible and resilient packing block 19 formed of rubber or the like supported against the under surface of the journal by the retainer plates 20.

For maintaining the block 19 against the surface of the journal under desired pressure or tension, said block is directly supported by the ears 21 extending under the lower surface thereof and fulcrumed at 22 to the plates 20 and having weights 23 on the outer ends thereof. Thus, the weights 23, through their fulcrum points 22, at all times tend to force the packing block 19 against the under surface of the journal.

For feeding the lubricant 17, carried in the bottom of the journal box, to the surface of the journal, said block is provided with a plurality of spaced apertures 24 extending from the bottom to the top thereof, said apertures being substantially triangular in section and reducing to a fine point, as illustrated in Fig. 3. Thus, the lubricant is caused to pass upwardly through said apertures to the journal through capillary attraction at the narrow portion of the apertures and is sucked through the wider portion thereof by reason of the creation of a vacuum induced by the rapid rotation of the journal.

In the modified form shown in Figs. 4, 5 and 6, the journal box is provided with a false bottom 25 below which the lubricant is contained. The packing block 119 is resiliently supported upon the false bottom by outwardly extending arms or flanges 26 formed integrally therewith of synthetic rubber or like flexible material. Thus, through the resilient arm 26, which if desired may be made of spring material and attached to the block, the block is constantly forced against the journal under tension. Said false bottom may be cast integral with the box or inserted therein, as would be the case in existing boxes.

Another form of aperture is illustrated in Fig. 6, wherein the block 219 is provided with apertures 224 tapering from the bottom to the top of the block. These apertures are somewhat oval in section, wider at their central portion and tapering to a fine point at each end, whereby passage of the lubricant is provided through the central portion under the action of suction created by rotation of the journal and will also be fed by capillary attraction at each side of the aperture.

As illustrated in Fig. 4, the false bottom 25 of the journal box is provided with a syphon 27 for returning excess lubricant to the reservoir, while leaving any precipitation of foreign matter on the false bottom so that it will not be carried into the reservoir.

From the foregoing, two forms of lubricating block are presented of such a character that no loose fibres may be carried to the bearing, and the block at all times, by reason of its flexibility and resiliency, will maintain the proper contact with the journal for feeding lubricant thereto. It will be understood, however, that other forms of lubricating block and mounting may be provided without departing from the invention as herein set forth.

The invention claimed is:

1. The combination with a journal box for railway trucks and a rotating journal extending therein, of a lubricant containing reservoir provided in the lower portion of said box and separated from the upper portion thereof by a false bottom plate, a flexible and resilient structural lubricating block supported by said plate having a portion thereof extending therethrough into the lubricant and the upper surface thereof in engagement with said journal, a resilient flange formed on said block bearing upon said plate for resiliently maintaining said block in engagement with said journal, said block being provided with a plurality of apertures extending therethrough from the lubricant chamber to the upper surface thereof through which lubricant is adapted to pass, each of said apertures tapering from an enlarged portion to a reduced portion for permitting of capillary attraction, and a syphon mounted on said plate for returning surplus oil from the upper portion of the journal box to the reservoir.

2. The combination with a journal box for railway trucks and a rotating journal extending therein, of a lubricant containing reservoir provided in the lower portion of said box and separated from the upper portion thereof by a false bottom plate, a flexible and resilient structural lubricating block supported by said plate having a portion thereof extending therethrough into the lubricant and the upper surface thereof in engagement with said journal, and a resilient flange formed on said block bearing upon said plate for resiliently maintaining said block in engagement with said journal, said block being provided with a plurality of apertures extending therethrough from the lubricant chamber to the upper surface thereof through which lubricant is adapted to pass, each of said apertures tapering from an enlarged portion to a reduced portion for permitting of capillary attraction.

3. The combination with a journal box for railway trucks and a rotating journal extending therein, of a lubricant containing reservoir provided by said box, a flexible and resilient structural lubricant block, and a resilient flange formed on said block bearing upon a structural member of said box for resiliently maintaining said block in engagement with said journal, said block being provided with a plurality of apertures extending therethrough from the lower end thereof to the upper surface through which lubricant is adapted to pass to said journal, each of said apertures tapering from an enlarged portion to a reduced portion for permitting of capillary attraction.

HAROLD E. BEHRMANN.